(12) United States Patent
Kado

(10) Patent No.: US 12,216,953 B2
(45) Date of Patent: Feb. 4, 2025

(54) IMAGE PROCESSING DEVICE, SYSTEM, AND METHOD OF CONTROLLING IMAGE PROCESSING DEVICE FOR A CODE IMAGE

(71) Applicant: Canon Kabushiki Kaisha, Tokyo (JP)

(72) Inventor: Kazuki Kado, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/987,154

(22) Filed: Nov. 15, 2022

(65) Prior Publication Data

US 2023/0195397 A1    Jun. 22, 2023

(30) Foreign Application Priority Data

Dec. 21, 2021  (JP) ................................. 2021-207089

(51) Int. Cl.
*G06F 16/955* (2019.01)
*G06F 3/14* (2006.01)
*G06K 19/06* (2006.01)
*H04N 1/00* (2006.01)
*H04N 1/32* (2006.01)

(52) U.S. Cl.
CPC ......... *G06F 3/14* (2013.01); *G06K 19/06028* (2013.01); *G06K 19/06037* (2013.01); *H04N 1/00244* (2013.01); *H04N 1/00464* (2013.01); *H04N 1/32106* (2013.01); *H04N 2201/3269* (2013.01)

(58) Field of Classification Search
CPC ............... G06F 3/14; G06K 19/06028; G06K 19/06037; H04N 1/00244; H04N 1/00464; H04N 1/32106; H04N 2201/3269

USPC .......................................................... 715/705
See application file for complete search history.

(56) References Cited

U.S. PATENT DOCUMENTS

| | | | |
|---|---|---|---|
| 8,752,758 B1 * | 6/2014 | Klebe ................... | G01G 23/01 235/383 |
| 10,171,469 B2 * | 1/2019 | Kishi .................. | G06F 16/9554 |
| 10,939,002 B2 | 3/2021 | Ikeda | |
| 2015/0067748 A1 * | 3/2015 | Kang ................. | H04N 21/4516 725/110 |

FOREIGN PATENT DOCUMENTS

| | | | | |
|---|---|---|---|---|
| JP | 2017-204696 A | | 11/2017 | |
| JP | 2021022123 A | * | 2/2021 | ......... G06F 16/9554 |
| JP | 2021-068122 A | | 4/2021 | |

\* cited by examiner

*Primary Examiner* — Haoshian Shih
(74) *Attorney, Agent, or Firm* — Venable LLP

(57) ABSTRACT

An image processing device includes a display unit and is capable of displaying web content provided via a web browser. The image processing device includes a first display controller displays web content acquired from a content server by using access information for acquiring the web content from the content server based on an instruction to display the web content, a QR generation unit generates a code image including the access information for acquiring the web content from the content server; and a second display controller displays the code image on the display unit. The QR generation unit generates a code image and the second display controller displays the code image on the display unit in a case where the first display controller is not able to display the web content.

21 Claims, 15 Drawing Sheets

FIG. 10

| FLAG NAME | FLAG |
|---|---|
| BROWSER DISPLAY OF HELP CONTENT | DO |

FIG. 14

| | FLAG NAME | VALUE |
|---|---|---|
| 1401 | FLAG NAME | VALUE |
| 1402 | MODEL NAME | XXX |
| 1403 | DESTINATION | JP |
| 1404 | APPLICATION | JOB |
| 1405 | ERROR CONTENT | 801 |

FIG. 15

| | 1502 | 1503 |
|---|---|---|
| 1501 | REDIRECTION URL | URL |
| | https://XXX/JP/JOB/801 | https://manual1/FAQ/801/jp |
| | https://XXX/JP/COPY | https://manual1/copy/jp |

IMAGE PROCESSING DEVICE, SYSTEM, AND METHOD OF CONTROLLING IMAGE PROCESSING DEVICE FOR A CODE IMAGE

BACKGROUND OF THE INVENTION

Field of the Invention

The present invention relates to an image processing device, a system, and a method of controlling the image processing device.

Description of the Related Art

There are technologies for acquiring web content corresponding to operational screens from networks and displaying the web content on embedded browsers of multi-function peripherals. Japanese Patent Laid-Open No. 2021-68122 discloses a technology for generating an URL of a manual of an image forming apparatus and a code indicating a page number of a manual corresponding to an operational screen and displaying the URL and the code on the operational screen. Japanese Patent Laid-Open No. 2017-204696 discloses a technology for acquiring web content associated with a specific event generated in an image processing device from a content server on the Internet and displaying the web content using a notice board application of a multi-function peripheral.

In the technologies of the related art, web content cannot be displayed with an embedded browser of a multi-function peripheral when the multi-function peripheral is not connected to a network.

SUMMARY OF THE INVENTION

According to an aspect of the present invention, web content is displayed simply with different devices.

According to an aspect of the present invention, an image processing device that includes a display and is capable of displaying web content provided via a web browser, the image processing device comprising: a memory storing instructions; and a processor executing the instructions causing the image processing device to: display web content acquired from a server by using access information for acquiring the web content from the server based on an instruction to display the web content; generate a code image including the access information for acquiring the web content from the server; and display the code image on the display, wherein the processor generates a code image and displays the code image on the display in a case where the web content is not able to be displayed.

Further features of the present invention will become apparent from the following description of exemplary embodiments with reference to the attached drawings.

BRIEF DESCRIPTION OF THE DRAWINGS

FIG. 10 is a diagram illustrating an example of a display setting.

FIG. 14 is a diagram illustrating an example of a set value table.

FIG. 15 is a diagram illustrating an example of a redirection table.

DESCRIPTION OF THE EMBODIMENTS

First Embodiment

Figure 1:
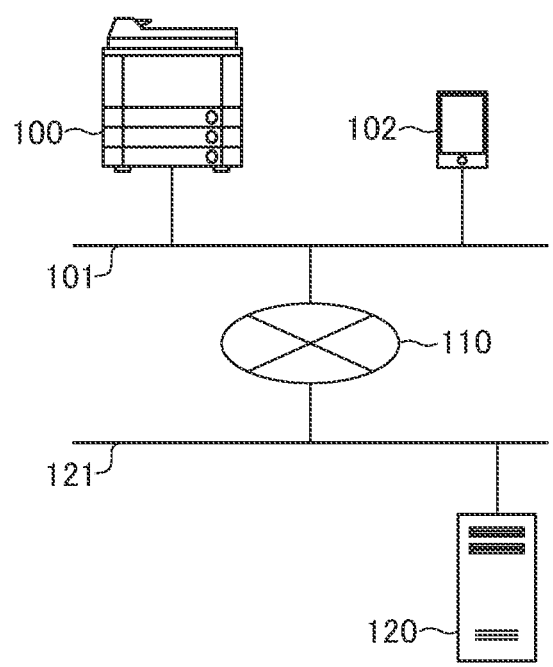
FIG. 1 is a diagram illustrating a configuration of an entire system.

FIG. 1 is a diagram illustrating a configuration of an entire system according to an embodiment. The system includes an image processing device 100, a mobile terminal 102 which is a device different from the image processing device 100, and a content server 120 that stores web content related to the image processing device 100. The image processing device 100, the mobile terminal 102, and the content server 120 are connected to each other via a network. The network is, for example, a LAN 101 connected to the image processing device 100 and the mobile terminal 102, a LAN 121 connected to the content server 120, and the Internet 110 connecting the LAN 101 to the LAN 121. The image processing device 100 and the mobile terminal 102 may be connected by another LAN via the Internet without using the same LAN 101. The network may be configured singly with, for example, a communication network such as a LAN or a WAN, communication by a USB, a cellular network (for example LTE, 5G, or the like), or a wireless network in conformity with IEEE 802.11, or may be configured in combination thereof. That is, the network may be capable of transmitting and receiving data and any communication scheme may be adopted.

The image processing device 100 is an example of a device that includes a so-called embedded browser capable of displaying web content acquired from a network via a web browser on a display unit such as a liquid crystal screen included in the device. The image processing device 100 is, for example, a multi-function peripheral (MFP) that has a plurality of functions such as a printing function, a copying function, and a scanning function. The image processing device 100 may be a single function peripheral (SFP) that has a single function of only a printing function. In the embodiment, a printing device that performs printing on a paper sheet or the like will be described as an example, but the present invention is not limited thereto. A printing device that performs 3D printing or the like to form a 3-dimensional object based on 3-dimensional shape data. Further, the image processing device 100 is an example of a device that includes an embedded browser. The embodiment can be applied to a device as long as the device is an information processing device that has an embedded browser. The image processing device 100 is connected to an Internet 110 via the LAN 101. The image processing device 100 can acquire web content such as an instruction manual, FAQ, or the like of the image processing device 100 from the content server 120 via the Internet 110.

The mobile terminal 102 is a device that can access the content server 120 via a network different from that of the image processing device 100. The mobile terminal 102 is, for example, an information processing device such as a smartphone or a tablet. The mobile terminal 102 according to the embodiment has a function of reading a QR code. In the embodiment, one mobile terminal 102 that performs a process from reading of a QR code to displaying of web content will be described, but the present invention is not limited thereto. For example, a plurality of devices may be configured in such a manner that a smartphone reads a QR code and a display device connected to a mobile terminal displays corresponding web content. The mobile terminal 102 is connected to the Internet 110 via the LAN 101.

The content server 120 stores various kinds of web content including an instruction manual and FAQ of the image processing device 100 and a starting status and the like of the image processing device 100 which is based on information collected from the image processing device 100. The content server 120 is connected to the Internet 110 via the LAN 121. The content server 120 may be implemented not only by a server device but also by a virtual machine (a cloud service) that uses resources provided by a data center including a server device.

Figure 2A:
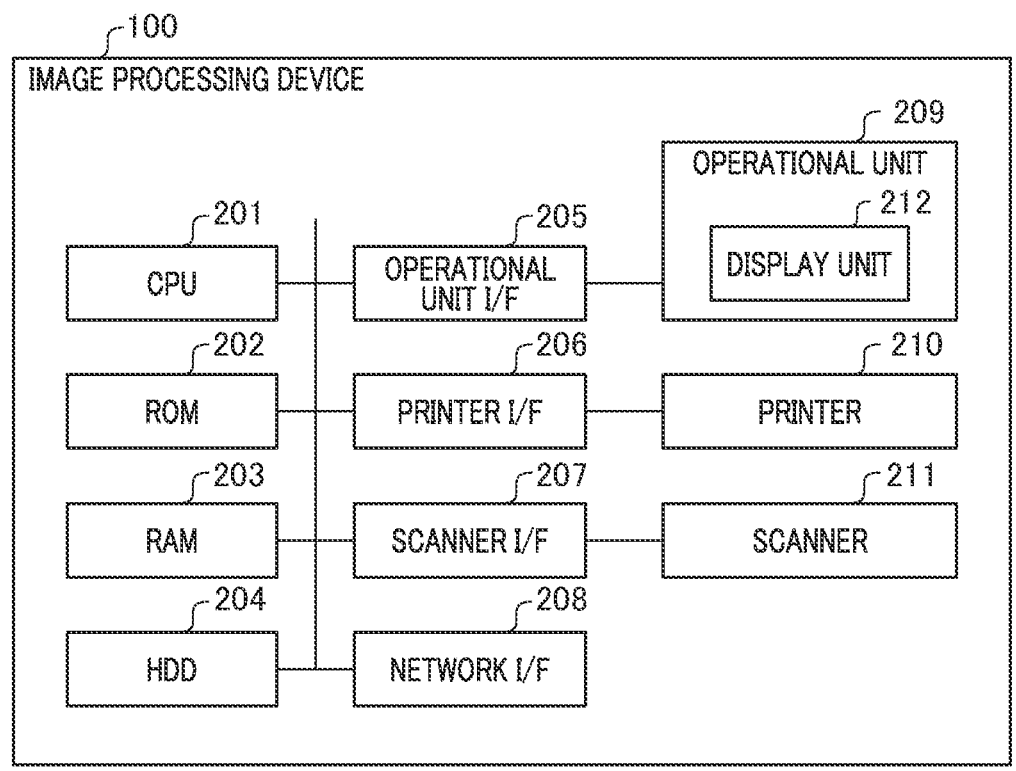
FIGS. 2A and 2B are diagrams illustrating hardware configurations of an image processing device and a mobile terminal.

FIG. 2A is a diagram illustrating a hardware configuration of the image processing device 100. The image processing device 100 includes a control unit 200, an operational unit 209, a printer 210, and a scanner 211. The control unit 200 controls an entire operation of the image processing device 100. The control unit 200 includes a CPU 201, a ROM 202, a RAM 203, an HDD 204, an operational unit I/F 205, a printer I/F 206, a scanner I/F 207, and a network IF 208.

A central processing unit (CPU) 201 reads a control program stored in the ROM 202 and performs and controls various functions of the image processing device 100, such as scanning, printing, communication, and displaying. The read-only memory (ROM) 202 is a memory for only reading data. For example, a program such as a boot program for a system of the image processing device 100 is stored. The random access memory (RAM) 203 is a memory capable of reading and writing data. The RAM 203 is used as a main memory of the CPU 201 and a temporary storage area such as a working area.

The hard disk drive (HDD) 204 is a large capacity storage unit that stores image data, various programs including an application program such as web browser, or various information tables. The HDD 204 can also store web content to be described below. In the embodiment, the HDD 204 will be described as an example of a storage unit, but the present invention is not limited thereto. A solid-state drive (SSD) may be used or a device in which an external medium such as a memory card is loaded and is capable of reading and writing data may be used. In the embodiment, it is assumed that one CPU 201 uses one memory (the RAM 203 or the HDD 204) to perform each process of a flowchart to be described below, but the present invention is not limited thereto. For example, a plurality of CPUs and a plurality of RAMs or HDDs may cooperate to perform each process.

The operational unit I/F 205 is an interface that connects the operational unit 209 to the control unit 200. The operational unit 209 displays various kinds of information for a user and accepts an operation, an input, and an instruction from the user. The operational unit 209 includes a display unit 212. The display unit 212 is, for example, a liquid crystal display that has a touch panel function. The operational unit 209 may include, for example, an input device such as a pointing device (for example, a touch pad, a touch panel, or the like) or a hardware key. The user can give an instruction such as an instruction to perform work with the image processing device 100 on a user interface screen displayed on a touch panel. By matching input coordinates with display coordinates on the touch panel, a GUI can be configured as if the user can directly operate a screen displayed on the touch panel.

The printer I/F 206 is an interface that connects the printer 210 to the control unit 200. The printer 210 is an image output device that forms an image in accordance with received printing work and outputs the image to a paper sheet or optically reads a document image set in the scanner 211 and outputs the document image to a paper sheet. Image data for printing is transmitted from the control unit 200 to the printer 210 via the printer I/F 206 to be printed on a paper sheet.

The scanner 10F 207 is an interface that connects the scanner 211 to the control unit 200. The scanner 211 is an image input device that optically reads a document set in a document table (not illustrated) or an auto document feeder (ADF) and generates image data. The image data generated by the scanner 211 is input to the control unit 200 via the scanner I/F 207.

The network I/F 208 is an interface that connects the control unit 200 to the LAN 101. The image processing device 100 transmits image data or information to each service on the Internet using the network I/F 208 or receives various kinds of information from external devices. For example, the image processing device 100 can cause the printer 210 to print and output (copy) the image data generated by the scanner 211 and also transmit a file or a mail to the outside via the LAN 101.

Figure 2B:
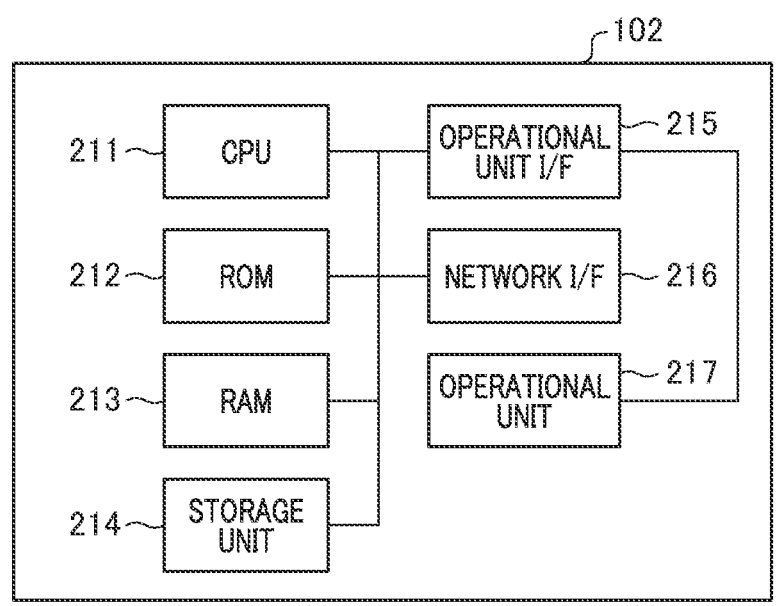

FIG. 2B is a diagram illustrating a hardware configuration of the mobile terminal 102. The mobile terminal 102 includes a CPU 211, a ROM 212, a RAM 213, a storage unit 214, an operational unit I/F 215, and a network I/F 216.

The CPU 211 controls an entire operation of the mobile terminal 102. The CPU 211 reads a control program stored in the ROM 212 or the storage unit 214 and performs various kinds of control. The ROM 212 stores a control program or the like which can be executed by the CPU 211. The RAM 213 is a main storage memory that is accessed by the CPU 211 and is used as a working area or a temporary storage area where various control programs are loaded. The storage unit 214 stores various programs and various kinds of setting information.

The operational unit I/F 215 is an interface that connects the operational unit 217 to the CPU 211. The operational unit 217 includes a display unit and an input/output unit. The operational unit 217 functions as a display unit that displays information for the user and functions as a reception unit that receives an instruction from the user. The CPU 211 performs display control of information in cooperation with the operational unit I/F 215 or reception control of a user operation. The network I/F 216 performs communication with an external device on a network or the Internet.

Figure 3:
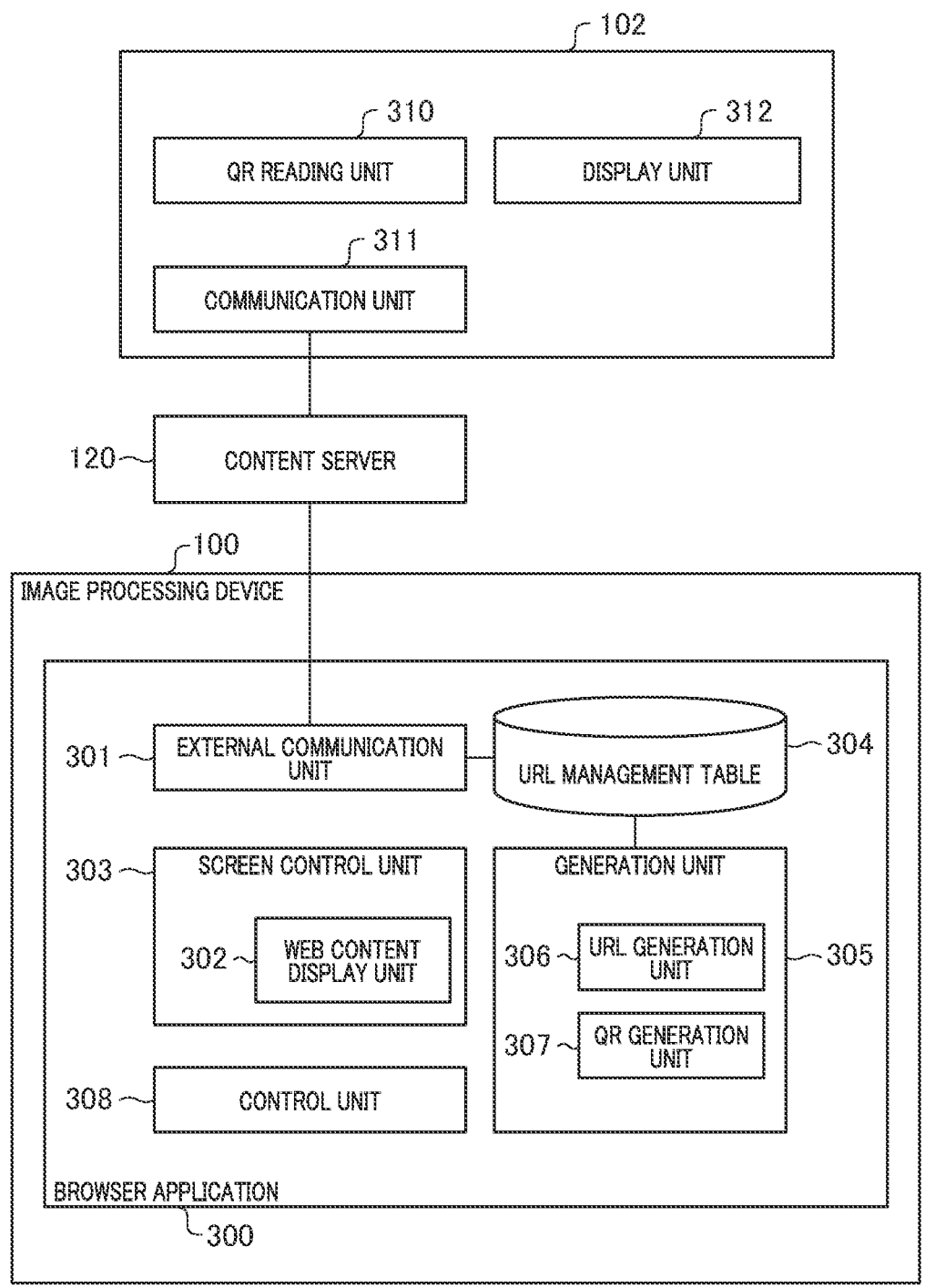
FIG. 3 is a diagram illustrating software configurations of the image processing device and the mobile terminal.

FIG. 3 is a diagram illustrating software configurations of the image processing device 100 and the mobile terminal 102. Each functional unit of the image processing device 100 illustrated in FIG. 3 is implemented by the CPU 201 of the image processing device 100 reading and executing a control program stored in the ROM 202 or the HDD 204. Similarly, each functional unit of the mobile terminal 102 illustrated in FIG. 3 is implemented by the CPU 211 of the mobile terminal 102 reading and executing a control program stored in the ROM 212 or the storage unit 214.

The image processing device 100 includes a browser application 300. The browser application 300 is an embedded software program mounted on the image processing device 100 and has a browser function of browsing web content of the content server 120 or the like on the network via the web browser. The browser application 300 includes an external communication unit 301, a screen control unit 303, an URL management table 304, and a generation unit 305.

The external communication unit 301 performs communication with an external device via the network. The external communication unit 301 according to the embodiment performs communication with the content server 120 to acquire web content managed by the content server 120. The URL management table 304 manages an URL for communicating with the content server 120. The generation unit 305 includes an URL generation unit 306 and a QR generation unit 307. The URL generation unit 306 generates access information for accessing an external device, such as an URL for acquiring web content from the content server 120. The QR generation unit 307 generates a code image such as a QR code containing access information such as an URL.

The screen control unit 303 controls output of a screen to the display unit 212. The screen control unit 303 controls a screen displayed on the display unit 212, for example, by switching a screen managed for each application and outputting the screen to the operational unit 209. The screen control unit 303 includes a web content display unit 302. The web content display unit 302 reads web content stored in the content server 120 or the HDD 204 to the RAM 203 and outputs the web content to the operational unit 20) for display. The web content is data such as text data, HTML, an image file (JPEG, GIF, or the like), a moving image file, or the like which can be browsed by a web browser. In this way, the screen control unit 303 also functions as a first display controller that displays web content. The screen control unit 303 also functions as a second display controller that displays a QR code generated by the QR generation unit 307.

The mobile terminal 102 includes a QR reading unit 310, a communication unit 311, and a display unit 312. The QR reading unit 310 reads a code image such as a QR code or a barcode to acquire access information such as an URL. The communication unit 311 performs communication with an external device such as the content server 120. The communication unit 311 according to the embodiment also functions as an acquirer that acquires web content from the content server 120. The display unit 312 controls display to the operational unit 217.

Figure 4:
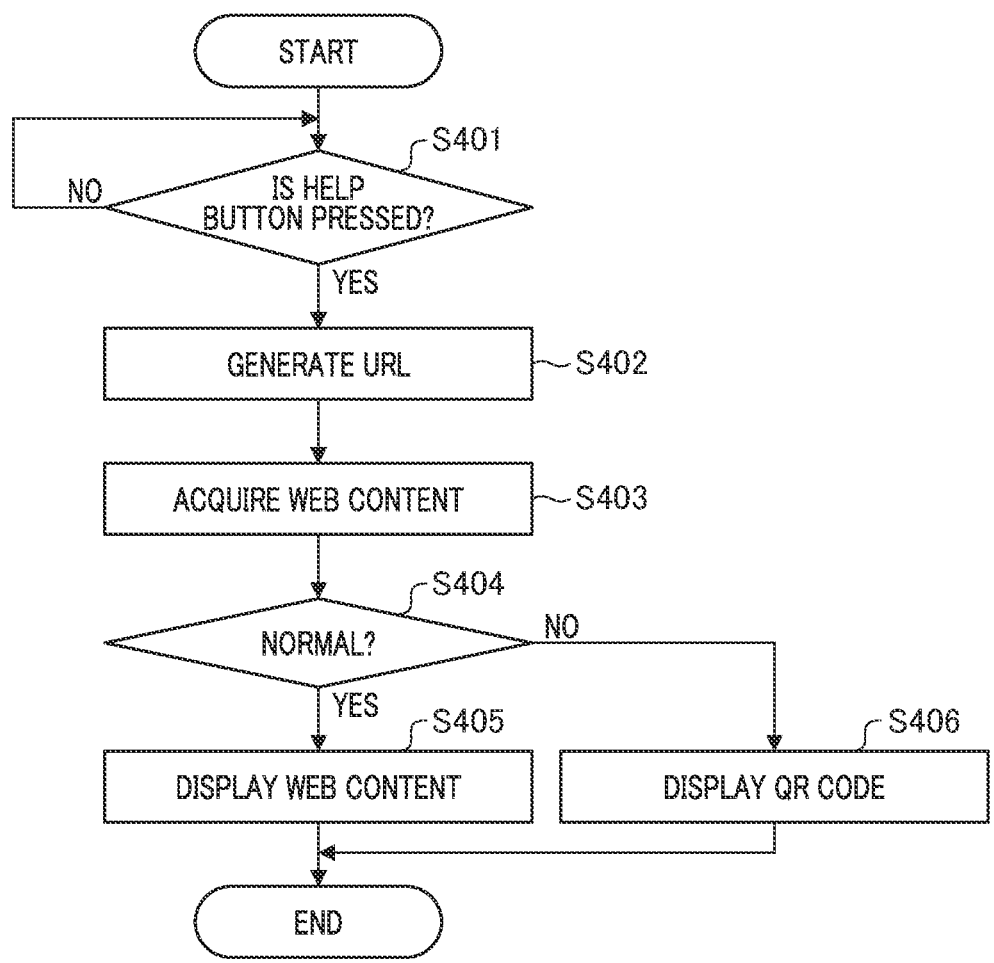
FIG. 4 is a flowchart illustrating a process of displaying a QR code when web content cannot be acquired.

A process of displaying a QR code when web content cannot be acquired will be described with reference to FIG. 4. FIG. 4 is a flowchart illustrating a process of displaying web content according to the first embodiment. Each process illustrated in FIG. 4 is implemented by the CPU 201 loading and executing programs stored in memories (the ROM 202 and the HDD 204) on the RAM 203.

In S401, the control unit 308 determines whether an instruction to display the web content is given. In the embodiment, the instruction to display the web content is assumed to be implemented by pressing a help button displayed on the display unit 212, and thus is determined whether the help button is pressed. As an example of the display of the help button, an example in which the help button is displayed on a work status confirmation screen will be described with reference to FIG. 5.

Figure 5:
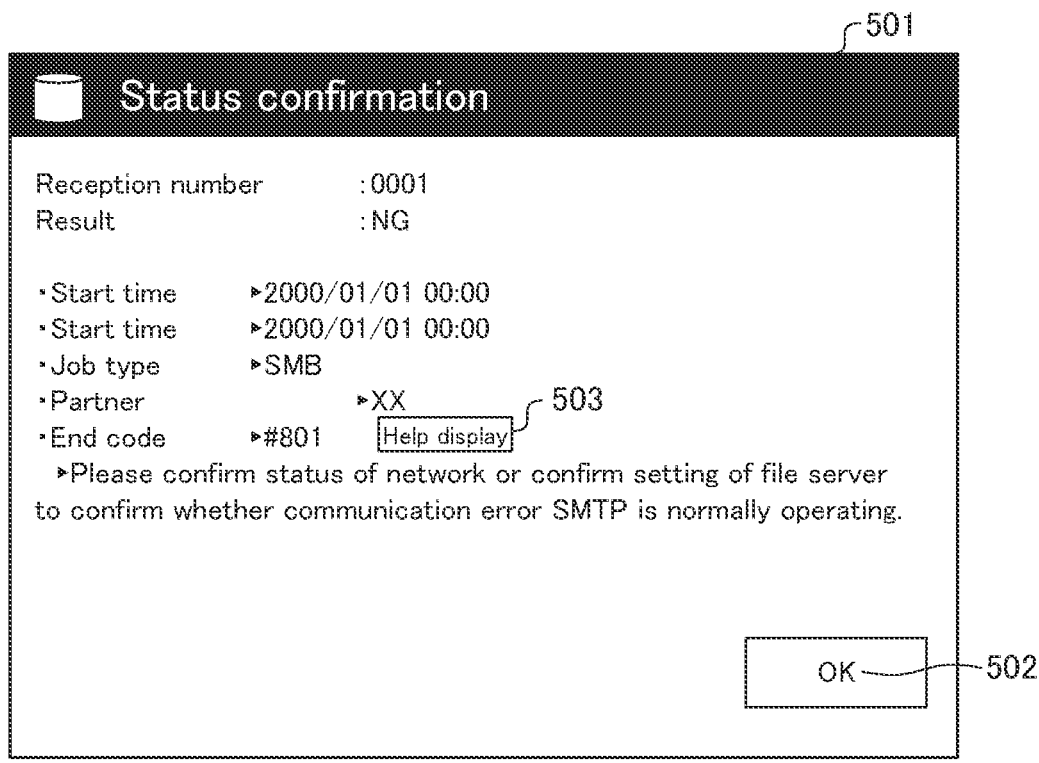
FIG. 5 is a diagram illustrating an example of a work status confirmation screen.

FIG. 5 is a diagram illustrating an example of a help button. A work status confirmation screen 501 illustrated in FIG. 5 is a screen for confirming a work status received by the image processing device 100. In the work status confirmation screen 501, an OK button 502 is displayed along with a reception number of work, an execution result, and the like, and the user confirming display content of the work status confirmation screen 501 can close the screen with the OK button 502. When an error is displayed on the work status confirmation screen 501, a help button 503 for confirming details of the error content is displayed. The help button 503 is an icon for displaying a help screen on which the details of the error content such as a cause of the error or countermeasures for solving errors can be confirmed. The help button for determining an instruction to display web content may be displayed on a screen other than the work status confirmation screen 501 and content displayed by pressing the help button is also not limited to the details of the error content. Any method for an instruction other than the selection of the help button may be used as long as the method is a method for an instruction to display web content. When it is determined in S401 that the help button 503 is not pressed, a process is awaited until the help button 503 is pressed. When it is determined in S401 that the help button 503 is pressed, the process of S402 is performed.

In S402, the URL generation unit 306 generates access information to the content server 120 in accordance with the error content of the work status confirmation screen 501. As the access information to the content server 120, for example, an URL is generated. The URL generation unit 306 generates an URL corresponding to the error content based on, for example, a status (the error content) of the image processing device 100 and domain information of the content server 120. The domain information of the content server 120 is stored in the RAM 203 or the HDD 204. The URL generation unit 306 stores the generated URL corresponding to the error content in the URL management table 304.

In S403, the external communication unit 301 performs communication with the content server 120 based on the URL generated in S402 and attempts to acquire web content managed in the content server 120. The external communication unit 301 transmits an HTTP request corresponding to the URL to the content server 120.

In S404, the control unit 308 determines whether the acquisition process for the web content in S403 is normally completed. For example, when a status code of a status line of the HTTP response returned from the content server 120 in S403 is "200," the control unit 308 determines that the acquisition process is normally completed. When the acquisition process for the web content is normally completed, a process of S405 is performed. Conversely, when it is determined that the acquisition process for the web content is not normally completed, a process of S406 is performed.

Figure 6:
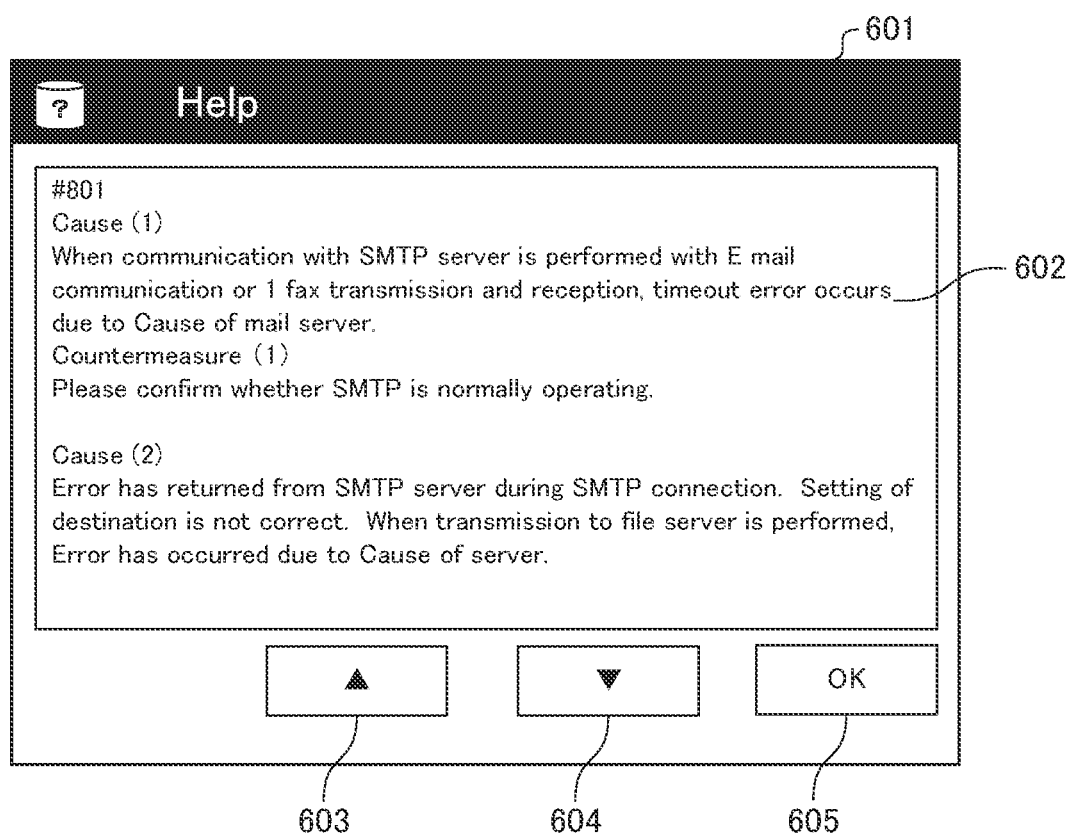
FIG. 6 is a diagram illustrating an example of a help screen.

In S405, the screen control unit 303 and the web content display unit 302 displays a help screen including web content corresponding to the help button pressed in S401 and acquired in S403 on the display unit 212. FIG. 6 is a diagram illustrating an example of a help screen. A help screen 601 includes a content display region 602, an upper scroll button 603, a lower scroll button 604, and an OK button 605. The web content acquired in S403 is displayed in the content display region 602. The user can use the upper scroll button 603 or the lower scroll button 604 to scroll and confirm content of the content display region 602. The user confirming the display content of the help screen 601 uses the OK button 605 to close the help screen 601, so that the help screen 601 can return to the work status confirmation screen 501. In this way, when the web content can be normally acquired with the image processing device 100 from the content server 120, the user can confirm detailed content (the help screen) of an error on the display unit 212 included in the image processing device 100.

Figure 7:
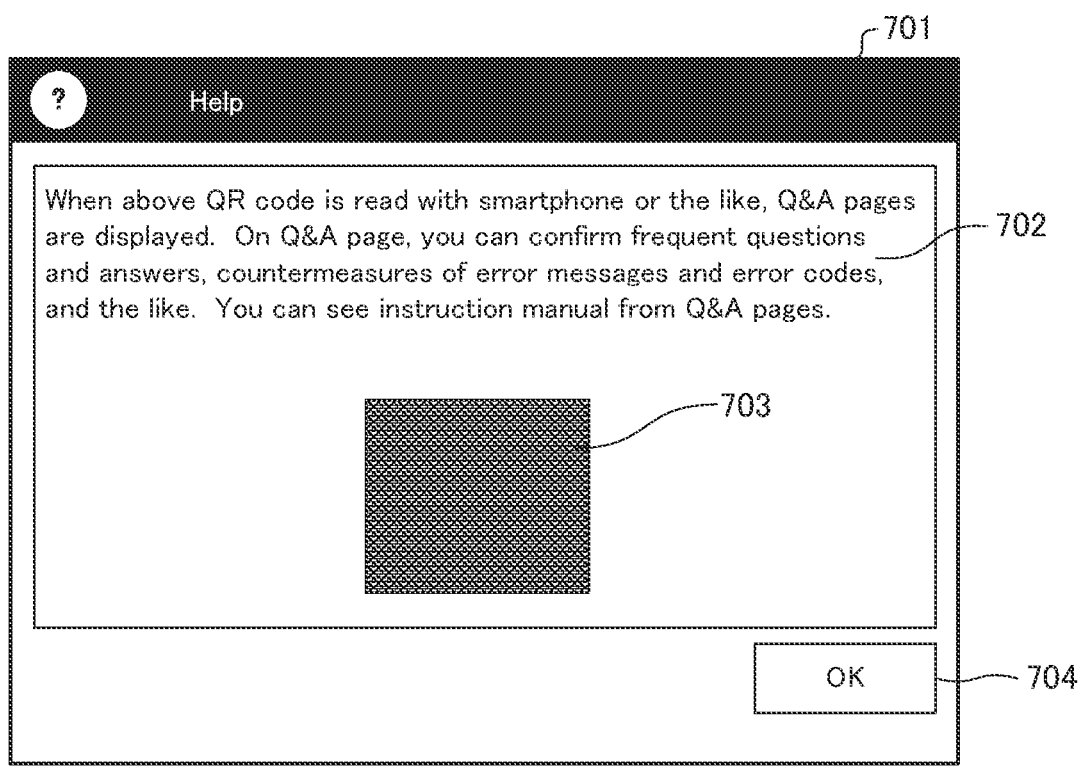
FIG. 7 is a diagram illustrating an example of a QR code screen.

In S406, the QR generation unit 307 generates a QR code including URL information generated in S402 and the screen control unit 303 displays a screen including the generated QR code on the display unit 212 of the image processing device 100. FIG. 7 is a diagram illustrating an example of a QR code screen. A QR code screen 701 includes a guide message 702, a QR code 703, and an OK button 704. In the guide message 702, a message for prompting the user to scan a QR code is displayed for the user. The QR generation unit 305 generates a QR code 703 in which the URL information generated in S402 is embedded and the screen control unit 303 displays both the QR code 703 and the guide message 702.

Figure 8:
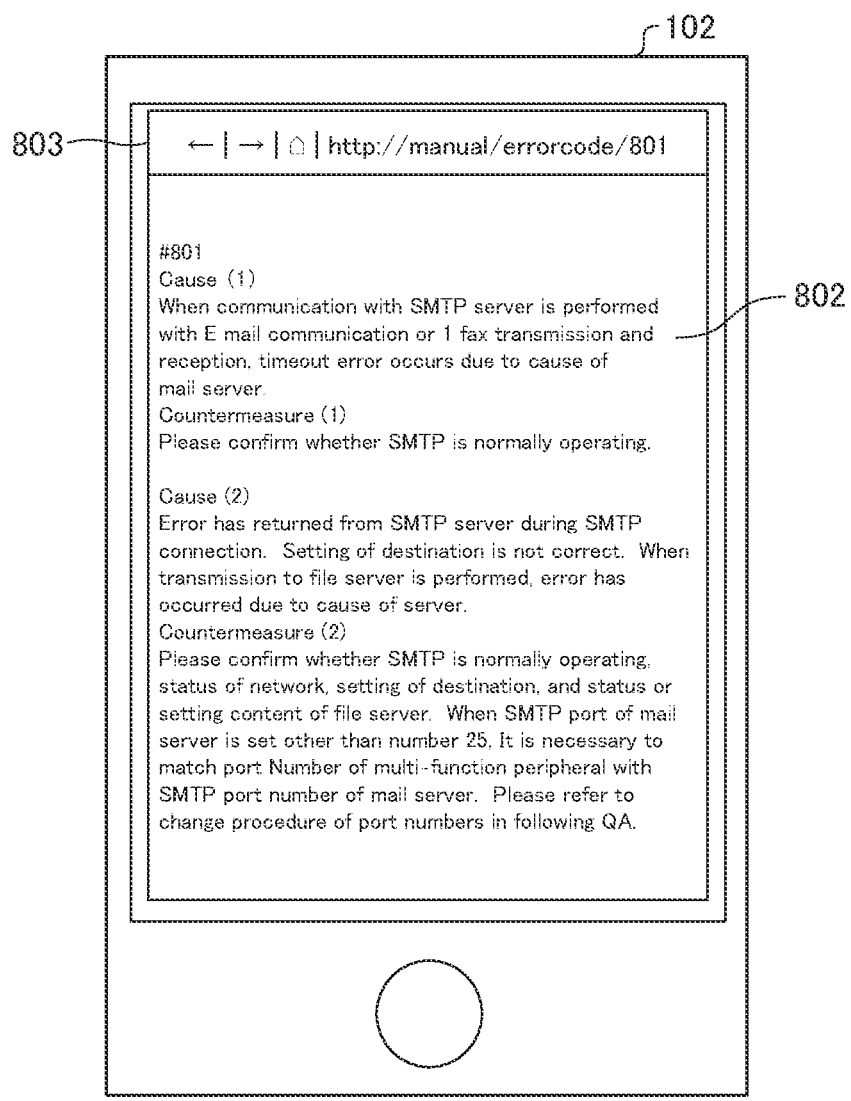
FIG. 8 is a diagram illustrating web content displayed on the mobile terminal.

The user can read the QR code 703 with the mobile terminal 102 in accordance with the guide message 702 and access the URL acquired from the QR code 703 to browse web content corresponding to the help button pressed in S401 with the mobile terminal 102. FIG. 8 is a diagram illustrating web content displayed on the mobile terminal 102. The mobile terminal 102 displays acquired web content 802 in a mobile terminal browser 803. The displayed web content 802 is the same as the web content acquired in S403 by the image processing device 100. Thus, even when the web content cannot be acquired with the image processing device 100, for example, when the image processing device 100 is not connected to the Internet 110, the user can acquire and confirm the web content with another device such as the mobile terminal 102.

In the embodiment, the example in which the QR code including the URL information is generated and displayed to display the web content on the mobile terminal 102 and the QR code is read has been described, but no QR code may not be used when the mobile terminal can refer to the URL information. For example, in S406, a code image such as a barcode with which the URL information can be acquired with the mobile terminal 102 may be displayed or an URL text string may be displayed.

In the foregoing flowchart, the display of the QR code is controlled as a condition that whether an HTTP response is normal, but the condition is not limited thereto. For example, when web content cannot be normally displayed under the condition that the web content can or cannot be normally displayed on the web content display unit 302, the QR code may be displayed. Thus, even when the web content cannot be normally displayed on the image processing device 100 due to a cause such as a data capacity excess despite the normal HTTP response, the QR code can be displayed. Further, whether to display the QR code may be switched in accordance with whether a network setting of the image processing device 100 is normally performed. That is, when the web content display unit 302 determines that the web content cannot be normally displayed and the QR code is configured to be displayed, any configuration may be determined. When the HTTP response is not normal, whether to display the QR code may be switched in accordance with a kind of error. For example, in the case of an error occurring since web content to be displayed is not originally retained in the content server 120, an error screen may be displayed without displaying the QR code. In this configuration, the QR code may not be displayed when the mobile terminal 102 cannot originally display the web content.

As described above, when web content cannot be displayed with the image processing device according to the embodiment, a code image including URL information can be generated and displayed on an operational screen, and thus the web content can be displayed simply with a different device.

Second Embodiment

A second embodiment will be described as an embodiment in which whether to display web content on the display unit 212 included in the image processing device 100 can be selected. Since a system configuration and hardware and software configurations of the image processing device 100 according to the second embodiment are the same as those of the first embodiment, description thereof will be omitted. Hereinafter, only a display process for web content different from that of the first embodiment will be described.

Figure 9:
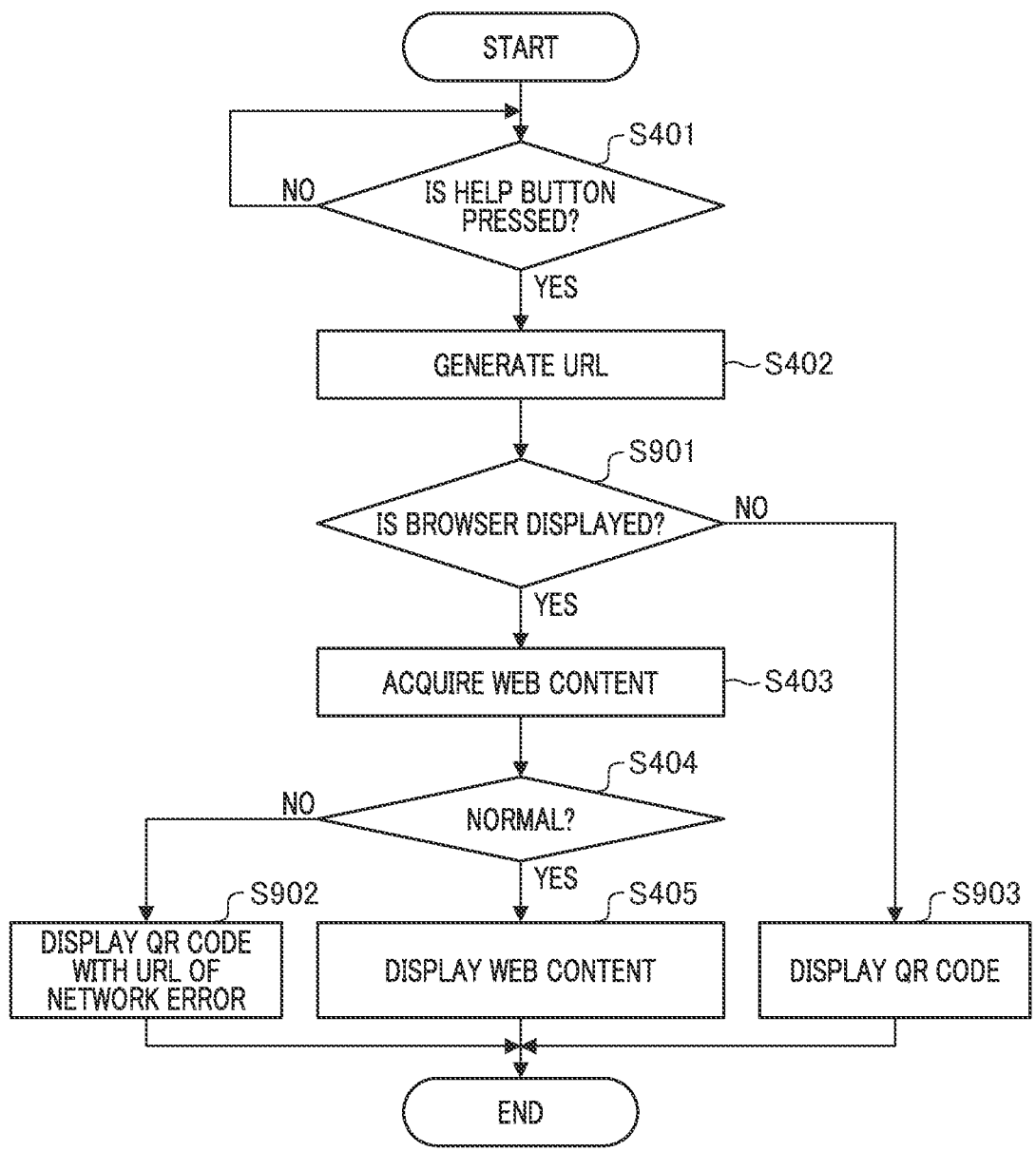
FIG. 9 is a flowchart illustrating a process of determining whether web content is displayed on a browser.

An embodiment in which whether to display web content on a browser application 300 can be selected will be described with reference to FIG. 9. FIG. 9 is a flowchart illustrating a process of displaying web content according to the second embodiment. Each process illustrated in FIG. 9 is implemented by loading and executing programs stored in memories (the ROM 202 and the HDD 204) on the RAM 203 by the CPU 201. The same reference numerals are given to the same processes as the processes (see FIG. 4) of the first embodiment, and description thereof will be omitted.

When a help button corresponding to an error is pressed (YES in S401) and an URL corresponding to error content is generated (S402), a process of S901 is subsequently performed. In S901, the control unit 308 determines whether to display the web content on the display unit 212 included in the image processing device 100, that is, the browser application 300. The control unit 308 determines whether to display the web content on the browser application 300 based on a display setting stored in the RAM 203 or the HDD 204.

FIG. 10 is a diagram illustrating an example of a display setting. A display setting 1001 includes a flag name 1002 and a flag 1003 corresponding to the flag name indicating a display target. When whether to display web content corresponding at the time of pressing of a help button is set, "Browser display of help content" is stored in the flag name 1002 and a value indicating whether one of "Do" and "Do not" is stored in the flag 1003. The display setting can be set or changed on the settings screen of the image processing device 100 by the user. When the flag 1003 of the display setting of the help content is "Do," a setting in which the web content is displayed is determined and a process of step S403 is performed. Conversely, when the flag 1003 of the display setting of the help content is "Do not," a setting in which the web content is not displayed is determined and a process of step S903 is performed. In the embodiment, the example in which the help content is displayed as the web content has been described, but the web content is not limited thereto. In S901, whether to display web content of a screen displayed in accordance with the button pressed in S401 may be determined in accordance with the display setting.

When the browser of the help content is displayed, in S403, the external communication unit 301 performs communication with the content server 120 based on the URL generated in S401 and attempts to acquire the web content. In S404, the control unit 308 determines whether the acquisition of the web content managed by the content server 120 in S403 is normally completed. When it is determined that the acquisition of the web content is normally completed, the process of S405 is performed. Conversely, when it is determined that the acquisition of the web content is not normally completed, the process of S902 is performed.

When it is determined in S404 that the web content can be acquired, the screen control unit 303 and the web content display unit 302 display the help screen 601 including the web content acquired in S403 in S405. Thus, the user can acquire detailed content of the work status confirmation screen 501 from the content server 120 and confirm the detailed content on the display unit 212 included in the image processing device 100.

When the web content cannot be displayed on the display unit 212 of the image processing device 100 despite the display setting, the QR generation unit 307 generates a QR code and displays a screen including the QR code in S902. The screen displayed herein is a screen for prompting the user to confirm the network of the image processing device 100 (a network connection guide screen) and the QR code includes URL information for acquiring the web content related to a network setting corresponding to a network error. An example of the network connection guide screen displayed on the display unit 212 when the web content cannot be displayed on the display unit 212 of the image processing device 100 despite the display setting will be described with reference to FIG. 11.

Figure 11:
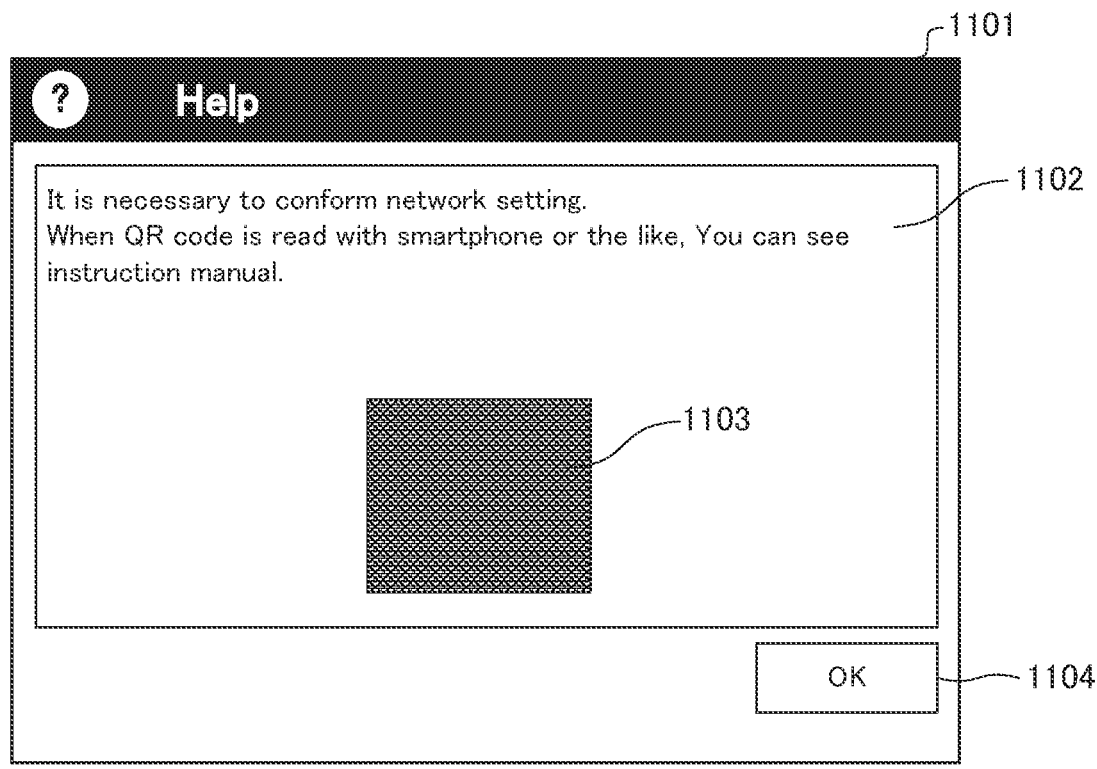
FIG. 11 is a diagram illustrating an example of a QR code screen in a network setting procedure.

FIG. 11 is a diagram illustrating an example of the network connection guide screen. A network connection guide screen 1101 includes a network connection guide message 1102, a QR code 1103, and an OK button 1104. In the network connection guide message 1102, for example, an intention indicating that it is necessary to confirm the network of the image processing device 100 and an intention indicating that a manual can be seen by reading the QR code 1103 are displayed. In the QR code 1103, URL information of an instruction manual for the network setting of the image processing device 100 is embedded. The user can read the QR code 1103 with the mobile terminal 102, so that the web content in which a detailed procedure of the network setting is described can be simply displayed on the mobile terminal 102. The method of displaying the URL information for accessing the web content displayed on the network connection guide screen 1101 is not limited to the QR code, but a barcode or an URL text string may be displayed. In addition to the QR code including the URL information corresponding to the network error in S902, the QR code including the URL information of the web content corresponding to the help button in S401 may be generated and the two QR codes may be displayed. Thus, the user can select the QR code to be read in accordance with a case where the user desires to troubleshoot a network error of the image processing device 100 or a case where the user desires to conform a help screen of an error immediately on the mobile terminal 102.

When the web content is not set to be displayed on the display unit 212 of the image processing device 100, the QR generation unit 307 generates a QR code and displays a screen including the QR code in S903. A QR code displayed when the web content is not set to be displayed on the display unit 212 of the image processing device 100 is an URL for displaying the web content with details of an error corresponding to the help button in S401 on the mobile terminal 102. That is, the QR code displayed in S903 is similar to the QR code displayed in S406 of the first embodiment. The web content 802 displayed on the mobile terminal 102 by reading the QR code is the same as the web content that the image processing device 100 has been attempted to acquire in S403 (see FIG. 8). Thus, the user can acquire and confirm the web content with a different device such as the mobile terminal 102.

According to the embodiment, the user can select whether to display the web content on the browser application 300 of the image processing device 100 or to display the web content on the mobile terminal 102 by scanning the QR code screen 701. Thus, in an environment where the mobile terminal 102 can be used freely, it is possible to solve a trouble occurring in the image processing device 100 by operating the image processing device 100 while confirming the web content on the mobile terminal 102. When the user expects to display the web content on the browser application 300 of the image processing device 100 but the web content cannot be displayed, information regarding the web content in which a detailed procedure of the network setting is described can be supplied to the user.

OTHER EMBODIMENTS

Method of Determining Whether Web Content can be Normally Acquired

In the process (S404) of determining whether the web content can be normally acquired, whether the web content can be normally acquired may be determined in accordance with a method other than analysis of an HTTP response. For example, when a general command ping (a network packet) for confirming arrival of a node in an IP network is transmitted to the own device (the image processing device 100) and the network packet is normally received, it is determined that the web content can be normally acquired. Conversely, when the network is transmitted to the own device and cannot be received, it is determined that the web content cannot be normally acquired. When the image processing device 100 is connected to the Internet, it may be determined that the web content can be normally acquired. When the image processing device 100 is not connected to the Internet, it may be determined that the web content cannot be normally acquired. When the image processing device 100 is connected to a LAN cable, it may be determined that the web content can be normally acquired. When the image processing device 100 is not connected to the LAN cable, it may be determined that the web content cannot be normally acquired.

Display Scenario of Help Button for Accessing Web Content

Figure 12:
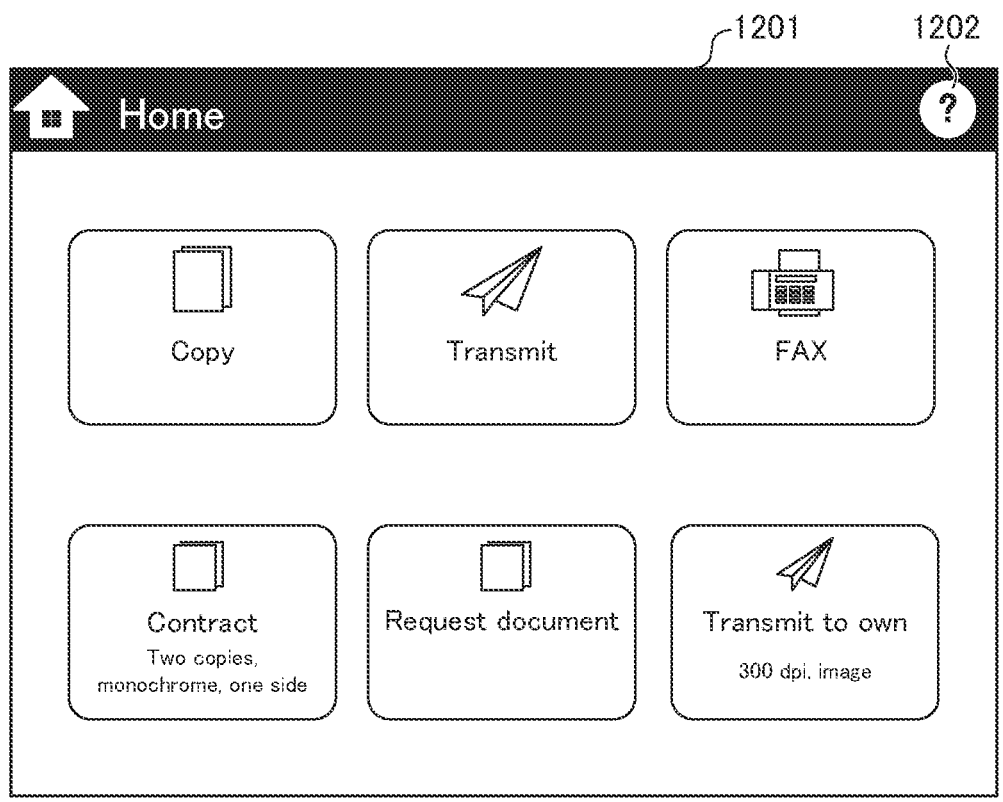
FIG. 12 is a diagram illustrating an example of a home screen.
Figure 13:
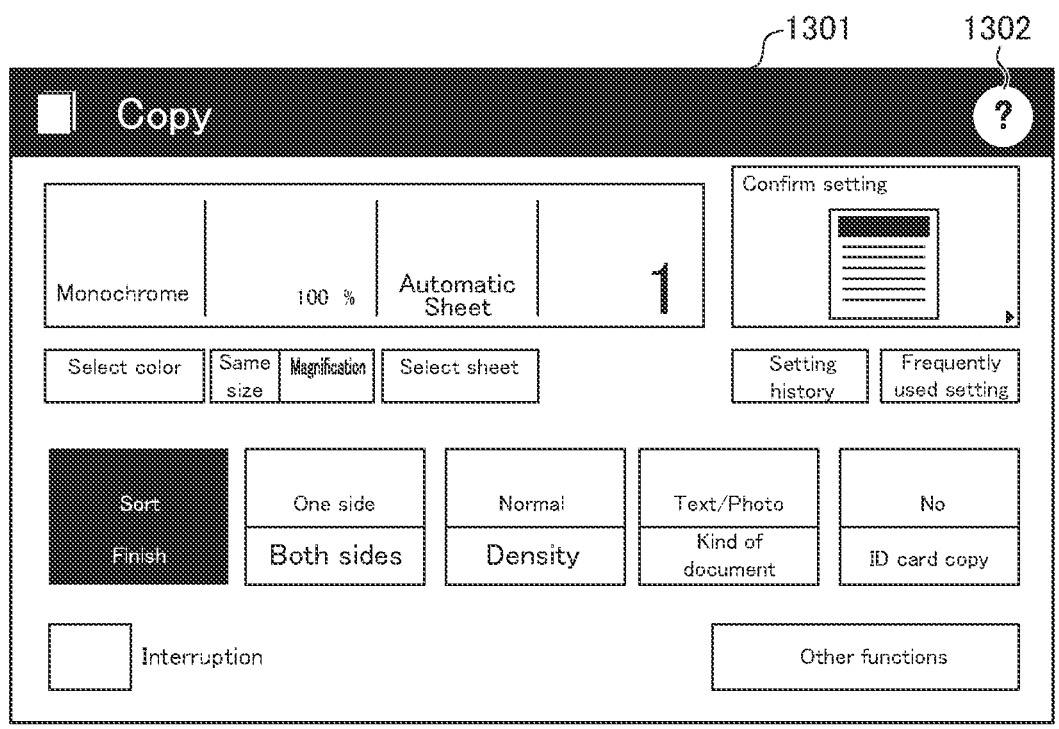
FIG. 13 is a diagram illustrating an example of a copy setting screen.

The help button 503 which is a target determined to be pressed or not to be pressed in S401 can be displayed on a screen other than the work status confirmation screen 501. The help button 503 is not limited to word display such as "help display" and the help button can also be expressed with only an icon. An example of the help icon will be described with reference to FIGS. 12 and 13. FIG. 12 is a diagram illustrating an example of a home screen. On a home screen 1201, a help icon 1202 and icons corresponding to functions of the image processing device 100 are displayed. The user can access web content in which a usage method for the entire image processing device 100 is described by pressing the help icon 1202 of the home screen 1201. FIG. 13 is a diagram illustrating an example of a copy screen. On a copy screen 1301, a setting screen for performing a copy setting and a help icon 1302 are displayed. The user can access web content in which a basic usage method for copy by pressing the help icon 1302 displayed on the copy screen 1301.

URL Generated to Access Web Content

In the process (S402 or S902) of generating the access information and the process (S403) of acquiring the web content, a redirection structure may be used. That is, the access information is not limited to an URL for accessing web content, but may be an URL for redirecting the content server 120 to the web content. The content server 120 that has a redirection structure includes a redirection table in which an URL generated by the image processing device 100 is associated with an URL of web content managed in the content server 120. The redirection structure will be described with reference to FIGS. 14 and 15 by exemplifying a case where the help button 503 of the work status confirmation screen 501 is pressed. FIG. 14 is a diagram illustrating an example of a set value table. FIG. 15 is a diagram illustrating an example of a redirection table. A set value table 1401 is stored in the RAM 203 or the HDD 204 of the image processing device 100. In the set value table 1401, a value for identifying content corresponding to the help button 503 is stored. As values of the set value table 1401, values indicating a model name, a destination, a display application, error information, and the like are stored. A redirection table 1501 is managed in the content server 120. In the redirection table 1501, a redirection URL 1502 acquired from the image processing device 100 is associated with an URL 1503 of the web content.

For example, when the help button 503 is detailed display of an error, values indicating a model name 1402 in which an error has occurred, a destination 1403, an application 1404 for displaying details of an error, and error information 1405 are acquired from the set value table 1401. The URL generation unit 306 generates the direction URL 1502 of an error by connecting the values acquired from the set value table 1401. The image processing device 100 access the content server 120 with the redirection URL 1502. The content server 120 returns web content in the URL 1503 corresponding to the direction URL 1502 to the image processing device 100 based on the redirection table 1501. By using a redirection function, it is easy to generate the URL in accordance with update of the web content of the content server 120 or a status of the image processing device 100.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-207089, filed Dec. 21, 2021, which is hereby incorporated by reference wherein in its entirety.

What is claimed is:

1. An image processing device that includes a display and is capable of displaying web content provided via a web browser, the image processing device comprising
   a memory storing instructions; and
   a processor that executes the instructions to cause the image processing device to:
   based on an instruction to display web content from a server, attempt to acquire the web content from the server by using access information for acquiring the web content from the server,
   determine whether the image processing device is able to display the web content on the display, and
   based on the result of the determination
   display the web content acquired from the server on the display, if the image processing device is able display the web content from the server on the display, and
   display a code image including the access information on the display, if the image processing device is not able to display the web content from the server on the display.

2. The image processing device according to claim 1, wherein the access information included in the code image is access information for acquiring the web content instructed to be displayed.

3. The image processing device according to claim 1, wherein, when web content is not set to be displayed on the display in a display setting regarding whether the web content is displayed on the display included in the image processing device, the processor displays the code image on the display without displaying the web content, regardless of whether the image processing device is able to display the web content on the display.

4. The image processing device according to claim 1, wherein, when web content is set to be displayed on the display in a display setting regarding whether the web content is displayed on the display included in the image processing device and is not able to display the web content on the display, the processor generates a code image including access information for acquiring web content related to a network setting of the image processing device and displays the code image on the display.

5. The image processing device according to claim 1, wherein it is determined that the image processing device is not able to display the web content from the server on the display in a case where an HTTP response of the web content is not normally completed, in a case where a network packet is transmitted to the image processing device and the network packet is not able to be received, in a case where there is no connection to the Internet, and in a case where a LAN cable is not connected.

6. The image processing device according to claim 1, wherein the access information is an URL for accessing web content or an URL for redirecting web content.

7. The image processing device according to claim 1, wherein the code image is a QR code or a barcode.

8. The image processing device according to claim 1, wherein the instruction is an instruction to display a help screen on the display shown by selecting a help button.

9. A system including an image processing device that includes a display and is capable of displaying web content provided via a web browser and an information processing device, the system comprising:
  the image processing device comprising:
  a memory storing instructions; and
  a processor that executes the instructions to cause the image processing device to:
    based on an instruction to display web content from a server, attempt to acquire the web content from the server by using access information for acquiring the web content from the server,
    determine whether the image processing device is able to display the web content on the display, and
    based on the result of the determination
      display the web content acquired from the server on the display, if the image processing device is able display the web content from the server on the display, and
      display a code image including the access information on the display, if the image processing device is not able to display the web content from the server on the display, and
  the information processing device comprising:
  a memory storing instructions; and
  a processor that executes the instructions to cause the information processing device to:
    read the code image displayed on the display and acquire the access information,
    acquire the web content from the server based on the access information acquired from the code image, and
    display the acquired web content on the information processing device.

10. A method of controlling an image processing device including a display and being capable of displaying web content provided via a web browser, the method comprising:
  attempting to acquire the web content from the server by using access information for acquiring the web content from the server;
  determining whether the image processing device is able to display the web content on the display;
  displaying the web content acquired from the server on the display, if it is determined in the determining that the image processing device is able display the web content from the server on the display; and
  displaying a code image including the access information on the display, if it is determined in the determining that the image processing device is not able to display the web content from the server on the display.

11. The image processing device according to claim 1, wherein the processor generates the code image and displays the code image on the display if it is determined that the image processing device is not able to display the web content on the display, and displays the web content on the display if it is determined that on the image processing device is able to display the web content on the display.

12. The image processing device according to claim 1, wherein it is determined that the image processing device is not able to display the web content from the server in a case where the data amount of the web content acquired from the server exceeds the capacity of data that can be displayed by the display.

13. The image processing device according to claim 1, wherein the processor generates the access information in response to the instruction to display the web content from the server.

14. The image processing device according to claim 8, wherein the help screen is displayed in a case where the help button is selected on a screen for confirming a state of a job received by the image processing device.

15. The image processing device according to claim 8, wherein the help screen is displayed in a case where the help button is selected on a home screen on which a plurality of functions including at least a copy function, which is a function of the image processing device, can be selected.

16. The image processing device according to claim 8, wherein the help screen is displayed in a case where a setting screen related to a copy function is displayed by selecting the copy function on a home screen on which a plurality of functions including at least the copy function, which are functions of the image processing device, are selectable, and the help button is selected on the setting screen related to the copy function.

17. The image processing device according to claim 1, wherein the web content acquired from the server is information on a cause of an error related to the image processing device and a countermeasure for resolving the error.

18. The image processing device according to claim 1, wherein in a case where the image processing device cannot display the web content from the server on the display, a code image including the access information and information indicating that information for resolving an error by reading the code image by a reading device is displayed on the reading device is displayed.

19. The image processing device according to claim 3, wherein in a case where the web content is not set to be displayed on the display in the display setting of whether or not to display the web content on the display, a first code image including the access information is displayed, and
  wherein in a case where the web content is set to be displayed on the display in the display setting of whether or not to display the web content on the display, but acquisition of the web content is not completed normally, a second code image including access information for acquiring the web content related to a network setting of the image processing device is displayed.

20. The image processing device according to claim 3, wherein in a case where it is determined that the web content is not set to be displayed on the display in the display setting of whether or not to display the web content on the display, a first code image including the access information is displayed; and
  wherein in a case where it is determined that the web content is set to be displayed on the display in the display setting of whether or not to display the web content on the display and it is determined that the acquisition of the web content is not normally completed, a second code image including access information for acquiring the web content related to the network setting of the image processing device is displayed.

21. An image processing device according to claim 19, wherein the display setting is received in a setting screen for receiving the display setting of whether or not to display the web content on the display from a user.

* * * * *